(12) United States Patent
Rozenman et al.

(10) Patent No.: US 7,606,811 B1
(45) Date of Patent: Oct. 20, 2009

(54) METHODS AND APPARATUS FOR SYNCHRONIZING INFORMATION

(75) Inventors: Vitaly Rozenman, Shrewsbury, MA (US); Benjamin Bushoy, Needham, MA (US); Evgeny Roytman, Sharon, MA (US)

(73) Assignee: EMC Corporation, Hopkinton, MA (US)

( * ) Notice: Subject to any disclaimer, the term of this patent is extended or adjusted under 35 U.S.C. 154(b) by 382 days.

(21) Appl. No.: 11/324,844

(22) Filed: Jan. 3, 2006

(51) Int. Cl.
*G06F 7/00* (2006.01)
*G06F 17/00* (2006.01)
*G06F 15/00* (2006.01)

(52) U.S. Cl. ............... 707/100; 707/103 R; 707/103 Y; 707/103 X; 707/103 Z (58) Field of Classification Search ......... 707/201–205, 707/101–102, 103 R, 103 Y, 103 X, 103 Z, 707/104.1; 711/113, 117; 714/6; 715/200–277
See application file for complete search history.

(56) References Cited

U.S. PATENT DOCUMENTS

| | | | | |
|---|---|---|---|---|
| 6,983,288 | B1* | 1/2006 | Kirkwood et al. | 707/103 R |
| 7,035,847 | B2* | 4/2006 | Brown et al. | 707/4 |
| 7,139,973 | B1* | 11/2006 | Kirkwood et al. | 715/206 |
| 7,216,133 | B2* | 5/2007 | Wu et al. | 707/203 |
| 7,222,141 | B2* | 5/2007 | Zondervan et al. | 707/204 |
| 2005/0015436 | A1* | 1/2005 | Singh et al. | 709/203 |
| 2006/0026219 | A1* | 2/2006 | Orenstein et al. | 707/204 |
| 2007/0130223 | A1* | 6/2007 | Savilampi et al. | 707/203 |

* cited by examiner

*Primary Examiner*—Cam Y Truong
*Assistant Examiner*—Cecile Vo
(74) *Attorney, Agent, or Firm*—Chapin IP Law, LLC; Barry W. Chapin, Esq.

(57) ABSTRACT

The present disclosure is directed to a system, method, apparatus, encoded computer readable media, etc., for maintaining data. A processor function maintains a map that keeps track of which data information stored in a first repository have corresponding record information stored in a second repository. The map can be used to facilitate synchronization of the first repository and the second repository. For example, the processor function can receive a command to delete a particular managed object from the first repository. In response to receiving the command, the processor function utilizes the map to identify whether the particular managed object to be deleted from the first repository has any corresponding related records stored in the second repository. If so, the processor function provides a notification (to an information management application associated with the second repository) indicating that the corresponding related record stored in the second repository can be deleted.

12 Claims, 8 Drawing Sheets

METHODS AND APPARATUS FOR SYNCHRONIZING INFORMATION

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

One way of managing resources associated with the storage area network is to maintain so-called managed objects in a respective database. In general, a managed object is a software entity that defines a corresponding hardware or software resource of the storage area network. The network administrator utilizes the managed objects to identify different resources associated with the storage area network.

A set of managed objects can form an object hierarchy. A "top level" object (e.g., an object at a highest tier) associated with the hierarchy represents a particular storage resource (e.g., storage system) in the storage area network. Objects in the hierarchy beneath the "top level" object represent hardware or software resources of the storage area network associated with the particular storage resource. Accordingly, a hierarchy of managed objects can define specific resources and corresponding sub-resources in the storage area network associated with a respective storage system.

A storage administrator typically configures the storage area network to include multiple storage systems by creating and maintaining multiple object hierarchies. As suggested above, each object hierarchy represents a unique storage system (e.g., portion of resources) associated with the storage area network. Certain resources can be shared among multiple storage systems. Thus, multiple object hierarchies associated with the storage area network can include the same managed object. Other resources of the storage area network can be exclusively used by a particular one of the defined storage systems.

In addition to maintaining managed objects and corresponding data in a database that define a respective configuration of a respective storage area network environment, a management control center can also maintain other types of related data in the same centrally located database. For example, the management control center can store so-called "services-related" information (or other data related to managed objects) in the same database as the managed objects. An example of a service (e.g., an alert) having corresponding services-related data stored in the centrally located database is a monitoring process that detects whether a respective storage system (as defined by the managed objects in the database) has been filled to capacity. The centrally located database can simultaneously store services related information for many corresponding services.

SUMMARY

Conventional applications that support management of objects having respective object data stored in relational databases can suffer from a number of deficiencies. For example, storing both managed objects (defining a storage area network configuration) as well as services related data in the same centrally located database can result in congestion because many different management applications may need to simultaneously access the database at the same time in order to carry out their intended respective functions.

One way of alleviating congestion in a centrally located database is to distribute respective data amongst multiple databases separated by a network. Unfortunately, distributing the data (e.g., managed objects and service-related data) amongst multiple databases makes it more difficult to ensure that the separately located and maintained databases are synchronized with respect to each other. For example, deletion of certain records in a first database may require deletion of corresponding related records in a second database.

To ensure that the separately located databases are synchronized with each other, a first management application deleting data from the first database can notify a corresponding second management application (associated with the second database) regarding which records are being deleted from the first database. A drawback with respect to this implementation is that the first management application may cause network congestion as a result of notifying the second management application of every record in the first database that is being deleted. For example, the first management application may be deleting many thousands of records stored in the first database. In such a case, the first management application would have to notify the second management application of identifiers associated with each record in the first database being deleted. Additionally, the second management application may have to then spend considerable time making a determination as to which corresponding related records in the second database must be deleted as a result of being notified of which of the records are being deleted from first database.

Techniques discussed herein deviate with respect to conventional applications such as those discussed above as well as other techniques known in the prior art. For example, embodiments herein include a processor function that maintains a map. The map keeps track of which records (e.g., managed objects) stored in a first repository (e.g., a local database) have corresponding data stored in a second repository (e.g., a remotely located database). During management of the first repository, the processor function can receive a command to delete a particular managed object from the first repository. Based on use of the map, the processor function can identify that the particular managed object being deleted has a corresponding related record stored in the second repository. Thereafter, the processor function can provide a notification of which specific corresponding related record stored in the second repository can be deleted. According to this technique, the first management application no longer needlessly notifies the second management application managing the second repository of every record that is being deleted from the first repository.

More specifically, one embodiment herein includes maintaining a map that tracks which of multiple managed objects in a first repository have corresponding records stored in a second repository. To maintain the map, for each of multiple records stored in the second repository, a respective processor function: i) receives a unique identifier value corresponding to a respective record stored in the second repository, the unique identifier value being received in response to a remote information management application writing the respective record in the second repository, the remote information management application utilizing the unique identifier value to keep track of information (associated with a respective service) stored in the second repository, ii) identifies a resource to which the respective record pertains, the resource having corresponding resource information stored in a respective managed object of the first repository, iii) identifies a respective resource identifier associated with a respective managed object stored in the first repository, and iv) generates an entry in the map to correlate the respective resource identifier with the unique identifier value.

The above-mentioned map can be used to facilitate synchronization of the first repository and the second repository. For example, the processor function can receive a command to delete a particular managed object from the first repository. In response to receiving the command, the processor function initiates deletion of the particular managed object (and potentially other managed objects) from the first repository. Note that deletion of managed objects in the first repository can occur at any point in this process and need not occur prior to notifying the second management application of related records that can be deleted.

Based on use of the map, the processor function identifies whether the particular managed object being deleted from the first repository has any corresponding related records stored in the second repository. If so, the processor function provides a notification to the second management application indicating that the corresponding related records stored in the second repository can be deleted. According to one embodiment, the processor function notifies the second management application by forwarding one or more respective unique identifier values retrieved from the map to the management application associated with the second repository. The one or more unique identifier values identify the corresponding related records that can be deleted from the second repository.

One advantage of utilizing the map according to certain embodiments herein is to reduce the amount of communication required between respective management applications associated with first and second repositories in order to keep them synchronized. For example, the first management application utilizes the map to notify the second management application of the corresponding records in the second repository that need to be deleted rather than merely notify the second management application of every record of multiple records that was deleted from the first repository. In one embodiment, note that a single delete command can result in deletion of many thousands (or more) records from the first repository. However, only a small subset of the many thousands of records may have corresponding related data stored in the second repository. Hence, in this example, the first management application would not needlessly notify the second management application of every record that has been deleted from the first repository. Instead, the first management application would notify the second management application only which corresponding records need to be deleted from the second repository.

Techniques herein are well suited for use in applications such as management of storage area network environments and other types of applications as discussed herein. However, it should be noted that configurations herein are not limited to use in such applications and thus configurations herein and deviations thereof are well suited for use in other applications as well. In other words, according to one embodiment, techniques herein can be deployed to maintain and synchronize any types of related data stored in separately located repositories.

In addition to the embodiments discussed above, other embodiments herein include a computerized device (e.g., a host computer, workstation, etc.) configured to support the techniques disclosed herein to facilitate maintaining keeping track of a managed object database as well as corresponding related records stored in a remote repository. In such embodiments, the computerized device such as a storage area network management control center includes a memory system, a processor (e.g., a processing device), a display, and an interconnect. The interconnect supports communications among the display, the processor, and the memory system. The memory system is encoded with a management application that, when executed on the processor, generates a map for tracking which managed objects in a first repository have corresponding records stored in a second repository according to techniques herein.

Yet other embodiments of the present application disclosed herein include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to facilitate mapping techniques according to an embodiment herein. For example, the computer program logic, when executed on at least one processor associated with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for managing configuration information according to an embodiment herein. The instructions, when carried out by a processor of a respective computer device, cause the processor to perform the steps of: i) maintaining a map that tracks which managed objects in a first repository have corresponding records stored in a second repository; ii) receiving a command to delete a particular managed object from the first repository; iii) based on use of the map, identifying that the particular managed object has a corresponding related record stored in the second repository; and iv) providing a notification indicating that the corresponding related record stored in the second repository can be deleted.

Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one embodiment, a processor function maintains a map that keeps track of which data information (e.g., managed objects) stored in a first repository (e.g., a local database) have corresponding records stored in a second repository (e.g., a remotely located database). The map can be used to facilitate synchronization of the first repository and the second repository. For example, the processor function can receive a command to delete a particular managed object from the first repository. In response to receiving the command, the processor function initiates deletion of the particular managed object as well as any related managed objects from the first repository. The processor function utilizes the above-mentioned map to identify whether the particular managed object (as well as any related managed objects) to be deleted from the first repository has any corresponding related records stored in the second repository. If so, the processor function provides a notification (to an information management application associated with the second repository) indicating that the corresponding related records stored in the second repository can be deleted.

Figure 1:
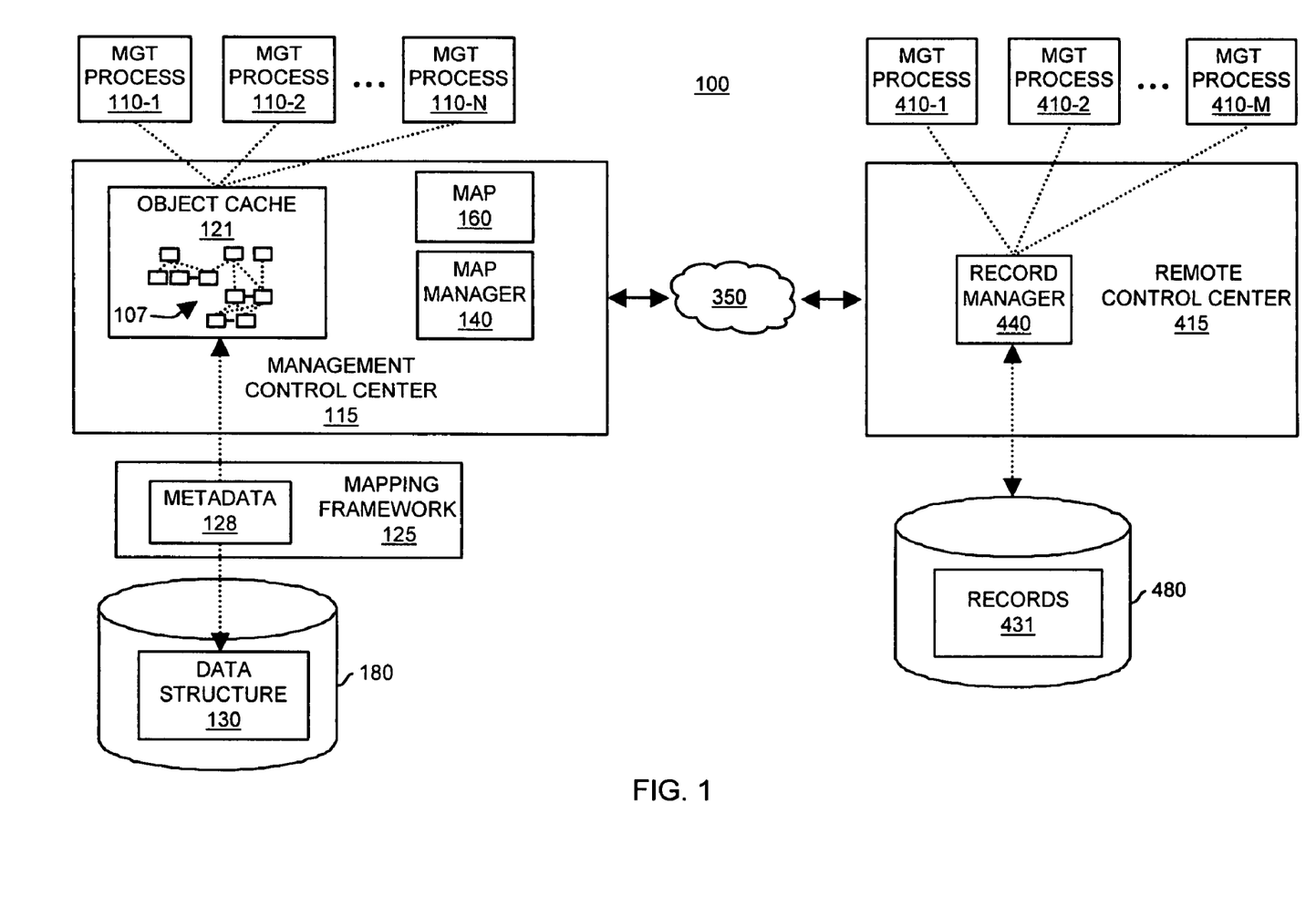
FIG. 1 is a diagram illustrating an environment for maintaining a respective map indicating related records stored in a remote location according to an embodiment herein.

FIG. 1 is a block diagram of a storage area network environment 100 according to an embodiment herein. As shown, storage area network environment 100 includes management process 110-1, management process 110-2, . . . management process 110-N (collectively, management processes 110), management control center 115, mapping framework 125, repository 180, network 350, management process 410-1, management process 410-2, . . . management process 410-M (collectively, management processes 410), remote control center 415, and repository 480. Management control center 115 includes object cache 121, map 160, and map manager 140. Mapping framework 125 includes metadata 128. Repository 180 includes data structure 130 for storing information associated with managed objects in object hierarchy 107. Remote control center 415 includes record manager 440. Repository 480 maintains records 431 of information associated with certain (e.g., a subset of the) managed objects stored in repository 180.

In general, management control center 115 instantiates object hierarchy 107 of object cache 121 based on use of metadata 128 and information stored in data structure 130. The managed objects in object hierarchy 107 correspond to or reflect the configuration of storage area network environment 100. Specific details of how management control center 115 creates object hierarchy 107 are discussed with respect to FIG. 2.

Referring again to FIG. 1, the management processes 110 can communicate with the management control center 115 in order to display respective images of a current configuration of storage area network environment 100 as indicated by respective managed objects in object hierarchy 107 of object cache 121. For example, management processes 110 in part represent one or more network administrators of corresponding applications accessing the object cache 121 and viewing configuration information at local or remote locations with respect to the management control center 115.

A respective network administrator viewing the configuration images associated with the storage area network environment 100 can initiate changes to the object hierarchy 107 such as deletion of one or more managed objects. Deletion of a specified managed object can result in deletion of the specific managed object as well as other related managed objects.

Map manager 140 of management control center 115 keeps track of which information in object cache 121 or repository 180 has related information (e.g., records 431) stored in repository 480. For example, management processes 410 in communication with the remote control center 415 can initiate execution of services, policies, etc. with respect to the managed objects maintained by management control center 115. Information (e.g., services data) associated with the services is stored in repository 480.

Note that in addition to services related data, repository 480 can be used to store any type of data associated with managed objects or related data stored in repository 180.

Upon deletion of one or more managed objects from object hierarchy 107, the management control center 115 utilizes the map 160 to identify and notify remote control center 415 of which related information in repository 480 can be deleted as a result of deleting managed objects from object cache 121 or repository 180. For example (as will be discussed more particularly with respect to FIG. 3), the management control center 115 checks whether the map 160 includes entries for any of the managed objects that will be or have been deleted from object cache 121 or repository 180. For those managed objects having entries in the map 160, the management control center 115 identifies a corresponding unique identifier value or unique object key identifying each record in repository 480 that happens to be related to the managed objects being deleted. The management control center 115 then forwards the list of any record identifiers (e.g., unique object keys) of corresponding records that should be deleted form repository 480 as a result of deleting managed objects from object cache 121.

To create map 160, the map manager 140 of management control center 115 populates respective entries in the map 160 each time remote control center 415 initiates storage of information (in repository 480) associated with a respective managed object managed by the management control center 115. As an example, assume that management process 410-1 initiates an alert service to provide notification when a particular storage system (represented by a respective managed object) in storage area network 100 exceeds a corresponding threshold value. Upon initiation of the alert service, the record manager 440 of remote control center 415 writes respective information (e.g., service-related data) associated with the alert service in repository 480 as a respective record. The record manager 440 keeps track of the respective record based on a unique identifier value (e.g., a unique object key) that is specifically created for the respective record upon initiation of the alert service.

When record manager 440 stores the record in repository 480, the record manager 440 notifies map manager 140 over network 350 of the unique identifier value associated with the record stored in repository 480 as well as a corresponding identifier of the managed object to which the alert service and respective record pertain. Based on this information, the map manager 140 then creates an association between the identified managed object and the record stored in repository 480.

The map manager 140 can repeat this process of creating an entry in map 160 each time record manager 440 stores information in repository 480 that happens to be related to managed objects (or other data) stored in repository 180. Note that record manager 440 may initiate storage of relatively few records of related information in repository 480 compared to the many hundreds, thousands, or millions of managed objects in object cache 121. As discussed above, upon deletion of one or more managed objects from object cache 121, the management control center 115 need not notify remote control center 415 of every managed object being deleted in order to keep information current in repository 480. Instead, management control center 115 can utilize map 160 to identify which subset of multiple deleted managed objects being deleted from object hierarchy 107 or repository 180 have corresponding data stored in repository 480. The management control center 115 then notifies the remote control center 415 of only the unique identifier values or unique object keys (e.g., the subset) of the corresponding related information that must be deleted from the repository 480. The unique object key identifies corresponding related records in the repository 480 to be deleted.

In one embodiment, the management control center 115 provides the notification of which information to delete from repository 480 after initiating deletion of a specified managed object in object cache 121 as well as corresponding managed objects that happen to inherently be deleted as a result of deleting the managed object specified by the command.

Figure 2:
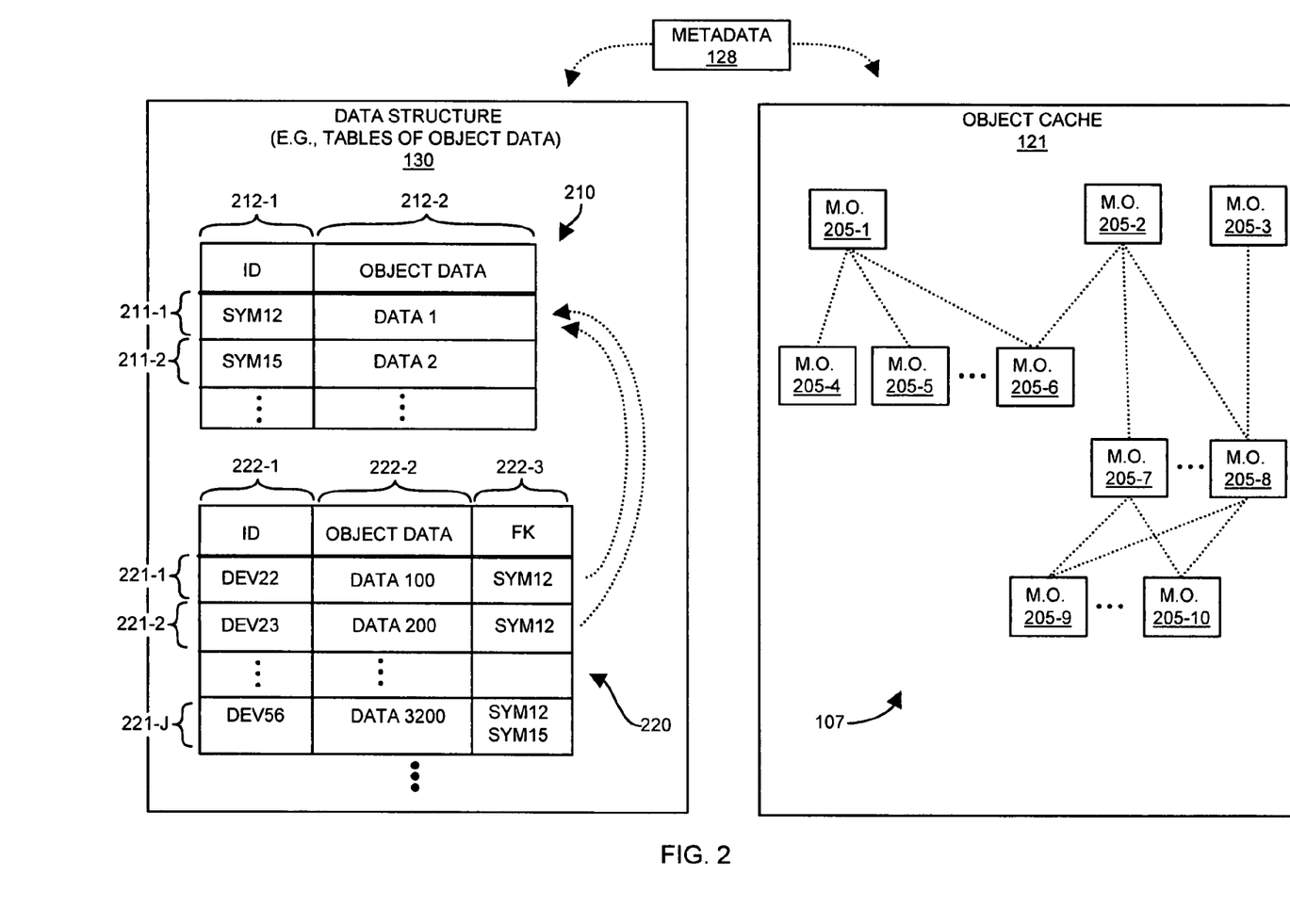
FIG. 2 is a diagram illustrating a data structure and corresponding instantiated managed objects in a cache according to an embodiment herein.

FIG. 2 is a block diagram more particularly illustrating how data structure 130 of database 180 (in FIG. 1) stores information associated with managed objects in object hierarchy 107 of object cache 121 (e.g., an object-oriented environment) according to an embodiment herein. As shown, object cache 121 includes different types of managed object hierarchies for maintaining information associated with resources in a storage area network.

Note that an actual instantiation of object hierarchies (e.g., what managed objects exist in a respective object hierarchy 107) can vary depending on how a respective storage area network is actually configured during operation. Also, note that in addition to the examples of object hierarchies discussed herein, examples of other sample managed object hierarchies associated with the storage area network can be found in related U.S. patent application Ser. No. 11/001,489 entitled "METHODS AND APPARATUS FOR DEALLOCATION OF RESOURCES," filed on Dec. 1, 2004, the entire teachings of which are incorporated herein by this reference. In one embodiment, object hierarchy 107 and corresponding information associated with object cache 121 can be viewed on a respective display screen by a corresponding network administrator executing one or more of management processes 110.

In general, the tables (e.g., table 210, table 220, ... ) of data stored in data structure 130 are used to create respective managed objects in object cache 121. In other words, the data associated with object hierarchy 107 in object cache 121 is stored in a respective repository 180. Thus, the managed objects are effectively stored in repository 180.

The management control center 115 uses metadata 128 to instantiate managed objects in object hierarchy 107. Upon deletion of a respective managed object from object cache 121 (e.g., based on receiving such a command from one or more of management processes), the management control center 115 initiates deletion of the managed object as well as any related managed objects.

In certain cases, deletion of a single managed object from the object cache 121 results in deletion of hundreds, thousands, millions, or more of managed objects in object cache 121. For example, a user may initiate deletion of a top-level managed object in a respective hierarchical tree that inherently results in deletion of many other managed objects at lower tiers. As discussed above, rather than notify record manager 440 of a respective identifier of every managed object that has been deleted (or modified) in response to receiving a respective command, the management control center 415 utilizes map 160 to identify corresponding related data (e.g., records 431) that can be or should be deleted as a result of carrying out a delete command according to an embodiment herein.

The following portion of this disclosure provides a detailed discussion of how the management control center 115 can instantiate an object hierarchy 107 in object cache 121 and maintains corresponding data in database 180 according to an embodiment herein.

Object hierarchy 107 in object cache 121 can depict different types of relationships based on use of different referencing techniques. For example, managed objects 205 in object cache 121 can be associated with each other via one-to-one relationships, one-to-multiple relationships, and multiple-to-multiple relationships. As will be discussed in the following as well as later in this specification, data structure 130 in database 180 supports these types of relationships.

One-to-one relationships correspond to relationships in which a "child" managed object in object hierarchy 107 belongs to only one corresponding parent managed object in a respective hierarchy. An example of a one-to-one relationship is managed object 205-7 because managed object 205-7 belongs solely to managed object 205-2 and no other managed objects at a next higher level.

One-to-multiple relationships correspond to relationships in which a "child" managed object belongs to multiple corresponding "parent" managed objects. An example of a one-to-multiple relationship is managed object 205-8 because managed object 205-8 belongs to both managed object 205-2 and managed object 205-3.

Multiple-to-multiple relationships correspond to relationships in which a group of "child" managed objects belongs to multiple different corresponding "parent" managed objects. An example of a multiple-to-multiple relationship is set of managed objects including managed object 205-9 and managed object 205-10. This set of managed objects belongs to both managed object 205-7 and managed object 205-8.

Note again that data structure 130 of relational database 180 stores information associated with managed objects 205 using the same types of relationships as discussed for objects in hierarchy 107 of object cache 121. In other words, the object hierarchy 107 can be defined based on one or more one-to-one, one-to-many, and many-to-many types of relationships.

One purpose of identifying or learning the different types of relationships associated with managed objects in a respective managed object hierarchy 107 is to be able to properly modify contents of database 180 after initiation of a "delete" command with respect to an object in a respective hierarchy. For example, certain entries (e.g., object data, pointers, etc.) in data structure 130 must be preserved so that data structure 130 continues to maintain integrity associated with those managed objects not being deleted, while other entries in database 180 must be deleted for the managed object being deleted. Thus, portions of the object hierarchy 107 not affected by a delete command will be preserved while those affected by the delete command will be removed after applying the delete object command.

As an example, assume that a user (e.g., a process 110) were to initiate deletion of managed object 205-1. In such a case, object data as well as references to object data associated with managed object 205-1, managed object 205-4 and managed object 205-5 will be deleted, etc. Additionally, a relationship reference (e.g., one or more pointers) between managed object 205-6 and managed object 205-1 will be deleted. However, object data for managed object 205-6 as well as a relationship reference between managed object 205-2 and managed object 205-6 must be preserved so as to maintain the integrity of managed object 205-2 and corresponding information in database 180 not being deleted. In other words, managed object 205-6 must not be deleted because managed object 205-6 is a "child" associated with managed object 205-2.

When modifying an object having an associated many-to-many type of relationship, the management control center modifies the managed objects 205 and corresponding data in data structure 130 such that repository 180 (e.g., a relational database) continues to maintain integrity associated with portions of the content that must continue to be maintained because such contents are associated with other objects not being deleted. In other words, the management control center 115 initiates modification to entries in tables of repository 180 for one-to-many relationships and many-to-many relationships so that repository 180 no longer maintains references to information for the object being deleted but continues to maintain the information for other objects not being deleted.

As discussed, deletion of a managed object 205 from object cache 121 and repository 180 will have an affect on information stored in data structure 130 of repository 180 for the corresponding object hierarchy 107. For example, contents of relational database 180 must be modified upon deletion of a corresponding managed object 205 so that database 180 does not needlessly store information associated with deleted managed objects.

Referring now more specifically again to data structure 130 in FIG. 2, table 210 and table 220 of data structure 130 are examples of how relational database 180 stores information associated with managed objects 205. This example will help illustrate what contents of data structure 130 are impacted as a result of deleting a corresponding object in object cache 121. Entry 211-1 (e.g., first row) and entry 211-2 (e.g., second row) of table 210 store object data associated with respective top level managed objects 205-1, 205-2, etc. In this example, unique identifier SYM12 of table 210 corresponds to managed object 205-1 representing a first Symmetrix™ type of storage system, unique identifier SYM15 of table 210 corresponds to managed object 205-2 representing a second Symmetrix™ type of storage system, etc.

Also, entry 221-1 and entry 221-2 of table 220 correspond to respective managed object 205-4 and managed object 205-5. Unique identifier DEV22 of table 220 corresponds to managed object 205-4 representing a device within the first Symmetrix™ type of storage system, unique identifier DEV23 of table 220 corresponds to managed object 205-5 representing a device within the first Symmetrix™ type of storage system, unique identifier DEV56 of table 220 corresponds to managed object 205-6 representing a device associated with both the first and second Symmetrix™ storage systems, etc.

Metadata 128 includes mapping information to indicate that entry 211-1 corresponds to managed object 205-1, entry 211-2 corresponds to managed object 205-2, entry 221-1 corresponds to managed object 205-4, entry 221-2 corresponds to managed object 205-5, entry 221-J corresponds to managed object 205-6, etc.

More specifically, metadata 128 identifies that managed object 205-1 has associated object data in entry 211-1 of table 210, managed object 205-4 has associated object data in entry 221-1 of table 220, managed object 205-5 has associated object data in entry 221-2 of table 220, managed object 205-2 has associated object data in entry 211-2 of table 210, and so on. Metadata 128 also includes mapping information indicating that unique identifier (e.g., SYM12) in column 212-1 of table 210 is associated with managed object 205-1 and that unique identifier (e.g., SYM15) in column 212-1 of table 210 is associated with managed object 205-2. In one embodiment, the unique identifiers in column 212-1 of table 210 are known as primary keys.

Metadata 128 also indicates the corresponding unique IDs (e.g., DEV22, DEV23, and DEV56) in column 222-1 associated with respective managed object 205-4, managed object 205-5, managed object 205-6, and so on. Consequently, a respective table in data structure 130 can store information associated with a respective set of managed objects at a certain level of a managed object hierarchy 107. In the present example, each entry in table 210 includes information associated with respective "top level" managed objects (e.g., managed objects 205-1, 205-2, and 205-3). Each entry in table 220 includes information associated with managed objects at a tier just below the top level managed objects. Additional tables in data structure 130 define other managed objects in other tiers and portions of object hierarchy 107.

Note that table 220 includes column 222-3 to store reference information or pointers known as foreign keys. A respective foreign key in one table points to an entry in another table. In the present example, the entry 221-1 in table 220 for DEV22 includes a foreign key pointing to SYM12. The entry 221-2 in table 220 for DEV23 includes a foreign key pointing to SYM12. The entry 221-N in table 220 for DEV56 includes a foreign key pointing to SYM12 and SYM15. Thus, based on use of foreign keys, data structure 130 mirrors the relationships amongst managed objects 205 in object cache 121. In one embodiment, metadata 128 includes the foreign keys as well so that procedure generator 140 can identify a hierarchy and corresponding entries of different tables in data structure 130 pertaining to a respective managed object.

Although the above example discusses how tables 210 and 220 store information associated with object hierarchies in object cache 121, repository 180 can include additional tables, sub-tables, etc. that function in a similar way to support storage of information associated with other portions or sub-portions of object hierarchies as well. Thus, repository 180 can include additional information for other managed objects in object cache 121 including managed object 205-7, managed object 205-8, managed object 205-9, and so on.

Figure 3:
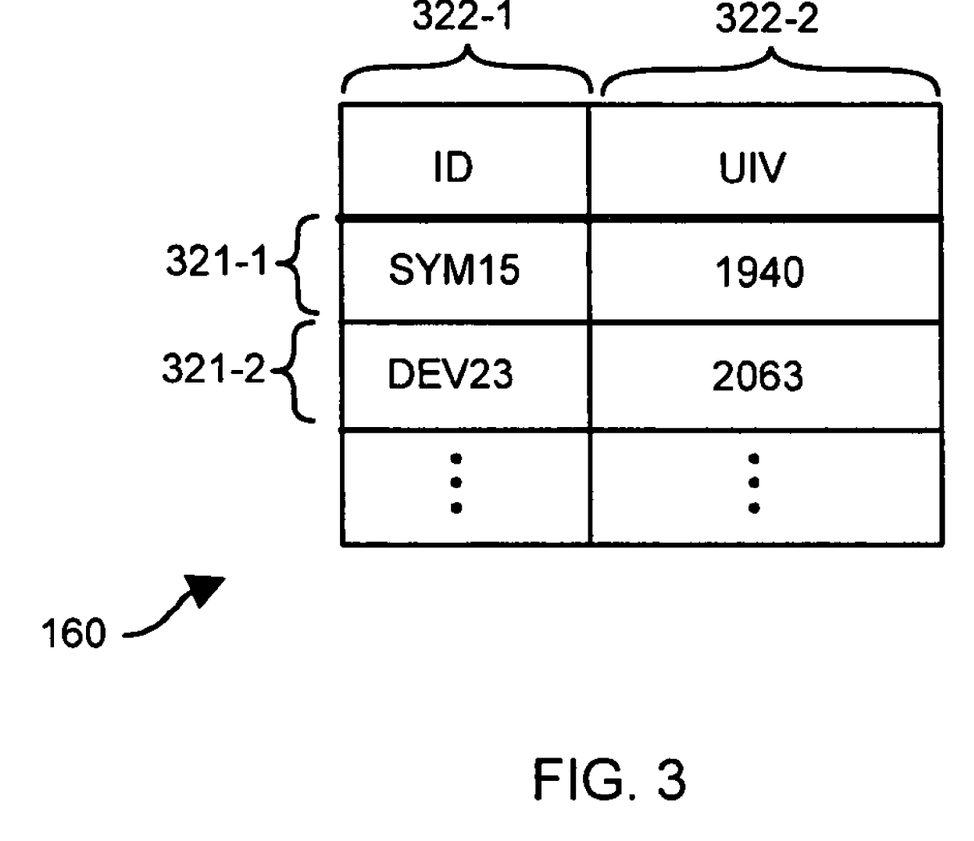
FIG. 3 is a diagram of a map indicating which of multiple records stored in a local database have corresponding related records stored in a remote database according to an embodiment herein.

FIG. 3 is a diagram of a map 160 according to embodiments herein. As shown, map 160 includes column 322-1 indicating identifiers associated with respective managed objects of object cache 121 and repository 180. Map 160 also includes column 322-2 indicating unique identifier values (e.g., a unique object keys) associated with respective records stored in repository 480. As discussed above, the map 160 indicates which managed objects in repository 180 have corresponding related data stored in repository 480. The unique identifier values identify the specific records of related data stored in repository 480.

More specifically, in the present example, entry 321-1 of map 160 indicates that the managed object associated with SYM15 of object hierarchy 107 has related information (in repository 180) stored in records 431 of repository 480. In particular, the entry 321-1 indicates that the related information associated with SYM15 has a respective unique identifier value of 1940.

In a similar manner, entry 321-2 of map 160 indicates that the managed object associated with DEV23 (e.g., a device within a respective storage system) of object hierarchy 107 has related information stored in records 431 of repository 480. In particular, the entry 321-2 indicates that the related information (in repository 480) associated with DEV23 has a respective unique identifier value of 2063.

As discussed above with respect to FIG. 1 according to one embodiment herein, the map manager 140 receives a unique identifier value for inclusion in map 160 in response to a remote management application (e.g., record manager 440) initiating an alert service with respect to a storage area network resource (e.g., the storage system as identified by SYM15). Recall that SYM15 identifies a respective managed object stored in repository 180. The remote management application (e.g., record manager 440 of remote control center 415) utilizes the received unique identifier value of 1940 to keep track of information associated with a service having respective information stored in repository 480. The map manager 140 creates an entry 321-1 in map 160 to indicate that the managed object associated with SYM15 in repository 180 has corresponding related data in repository 480.

According to one embodiment, the service associated with SYM15 is an alert service initiated by one of management processes 410. The alert service monitors when the storage area network resource exceeds a capacity threshold value. If a utilized storage level of the resource associated with SYM15 happens to exceed the capacity threshold value, the remote control center 415 communicates a respective alert or notification to management control center 115.

As previously discussed, only certain ones of many managed objects stored in object cache 121 have related data stored in repository 480. Map 160 identifies which of the managed objects in object cache 121 have related records stored in repository 480. Thus, upon modification such as deletion of one or more managed objects from object cache 121 and a corresponding database, the map manager 140 identifies which of the managed objects being deleted from the object hierarchy 107 have corresponding related data in repository 480. For example, the map manager 140 determines respective identifier values associated with the managed objects deleted from object cache 121 and/or repository 180 and checks whether any of the respective identifiers are present in map 160. The map manager 140 identifies unique identifier values of related records associated with respective managed objects being deleted. Thereafter, the management control center transmits the set of one or more unique identifier values (e.g., unique object keys) associated with records in repository 480 that can be deleted because they no longer store any useful information associated with existing managed objects in storage area network environment 100. In other words, if a network administrator deletes the managed object associated with SYM15, the alert service as well as the corresponding data stored in repository 480 also can be deleted.

In one embodiment, the map manager 140 of FIG. 1 maintains the map 160 as a hashing map. A hashing map enables quick conversion of a resource identifier value (e.g., SYM15, DEV23, etc.) associated with a deleted managed object into a unique identifier value identifying corresponding related one or more records stored in repository 480. Accordingly, upon deletion of managed objects and/or corresponding data from repository 180, the management control center 115 utilizes such a hashing map to quickly convert the resource identifier values associated with the managed objects being deleted into corresponding unique identifier values associated with the corresponding related records stored in the repository 480. As discussed above, according to one embodiment herein, the management control center 115 notifies record manager 440 to delete the corresponding related records stored in the second repository by including the unique identifier values in a respective notification. In other words, the management control center 115 transmits a message including the unique identifier values over network 350 to notify record manager 440 of which records to delete from repository 480.

Figure 4:
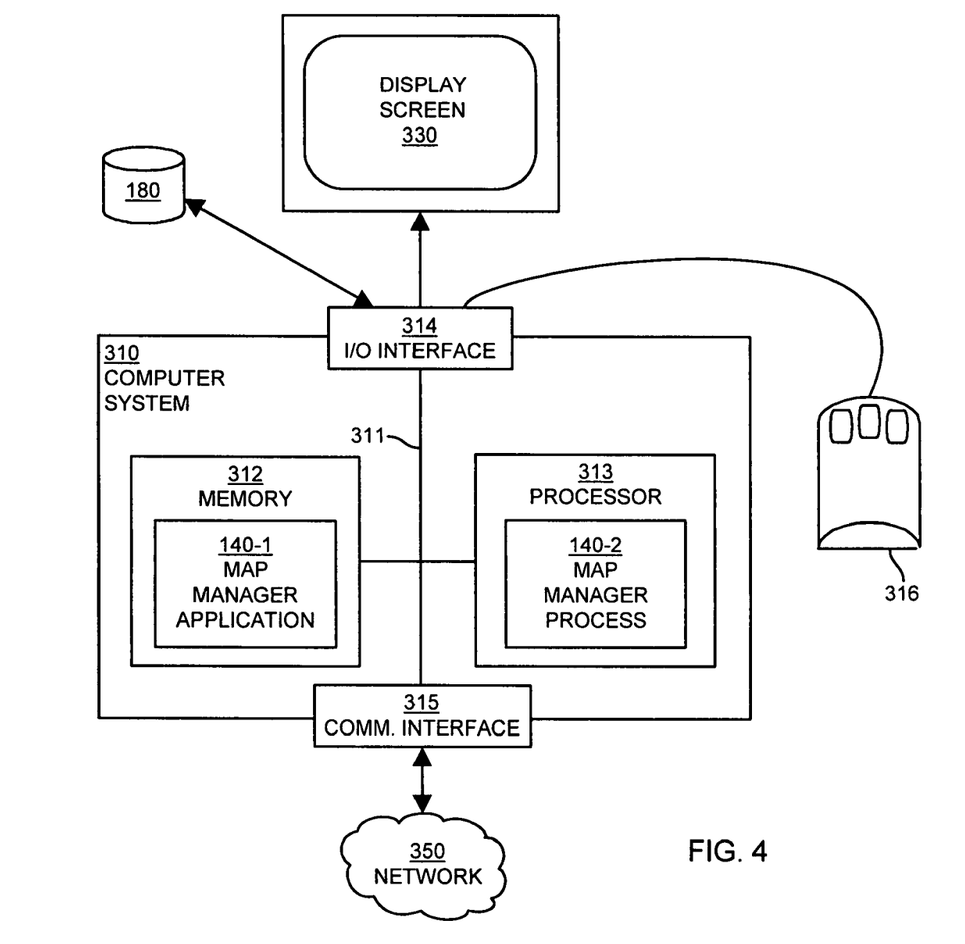
FIG. 4 is a diagram of an example processing platform for performing techniques according to an embodiment herein.

FIG. 4 is a block diagram illustrating an example computer system 310 (e.g., a management control center 115) for executing map manager 140 and other processes according to embodiments herein. Computer system 310 (e.g., management control center 115) may be a computerized device such as a personal computer, workstation, portable computing device, console, network terminal, processing device, etc.

As shown, computer system 310 of the present example includes an interconnect 311 that couples a memory system 312, a processor 313, an I/O interface 314, and a communications interface 315. Peripheral devices 316 (e.g., one or more optional user controlled devices such as a keyboard, mouse, display screens, etc.) couple to processor 313 through I/O interface 314. I/O interface 314 also enables computer system 310 to access repository 180 and display configuration information on display screen 330. Communications interface 315 of computer system 310 enables computer system 310 to communicate over network 350 to transmit and receive information from different resources. In one embodiment, computer system 310 can initiate the display of configuration information on corresponding display screens for viewing by one or more respective network administrators that manage a storage area network environment.

As shown, memory system 312 is encoded with map manager application 140-1 supporting identification and notification with respect to deletion of certain managed objects associated with a storage area network environment. Map manager application 140-1 can be embodied as software code such as data and/or logic instructions (e.g., code stored in the memory or on another computer readable medium such as a disk) that support functionality according to different embodiments described herein.

During operation, processor 313 accesses memory system 312 via the interconnect 311 in order to launch, run, execute, interpret or otherwise perform the logic instructions of the map manager application 140-1. Execution of map manager application 140-1 produces processing functionality in map manager process 140-2. In other words, the map manager process 140-2 represents one or more portions of the map manager application 140-1 (or the entire application) performing within or upon the processor 313 in the computer system 310.

It should be noted that map manager 140 (also in FIG. 1) executed in computer system 310 can be represented by either one or both of the map manager application 140-1 and/or the map manager process 140-2. For purposes of this discussion and different embodiments herein, general reference will again be made to the map manager 140 as performing or supporting the various steps and functional operations as previously discussed and as will be discussed further in this specification.

It should be noted that, in addition to the map manager process 140-2, embodiments herein include the map manager application 140-1 itself (i.e., the un-executed or non-performing logic instructions and/or data). The map manager application 140-1 may be stored on a computer readable storage medium such as a floppy disk, hard disk, or optical storage medium. The map manager application 140-1 may also be stored in a computer readable storage medium such as a memory type system such as in firmware, read only memory (ROM), Random Access Memory or RAM. In this example, executable code is stored within the memory system 312 (e.g., within Random Access Memory or RAM). In addition to these embodiments, it should also be noted that other embodiments herein include the execution of map manager application 140-1 in processor 313 as the map manager process 140-2. Thus, those skilled in the art will understand that the computer system 310 may include other processes and/or software and hardware components, such as an operating system that controls allocation and use of hardware resources.

Functionality supported by computer system 310 such as management control center 115 (and corresponding sub-process such as map manager 140) will now be discussed via flowcharts in FIGS. 5-7. For purposes of this discussion, computer system 310 and, more particularly, map manager 140 can perform steps in the flowcharts at run-time. This functionality can be extended to the other entities as well. Also, note that the steps in the below flowcharts need not always be executed in the order shown.

Figure 5:
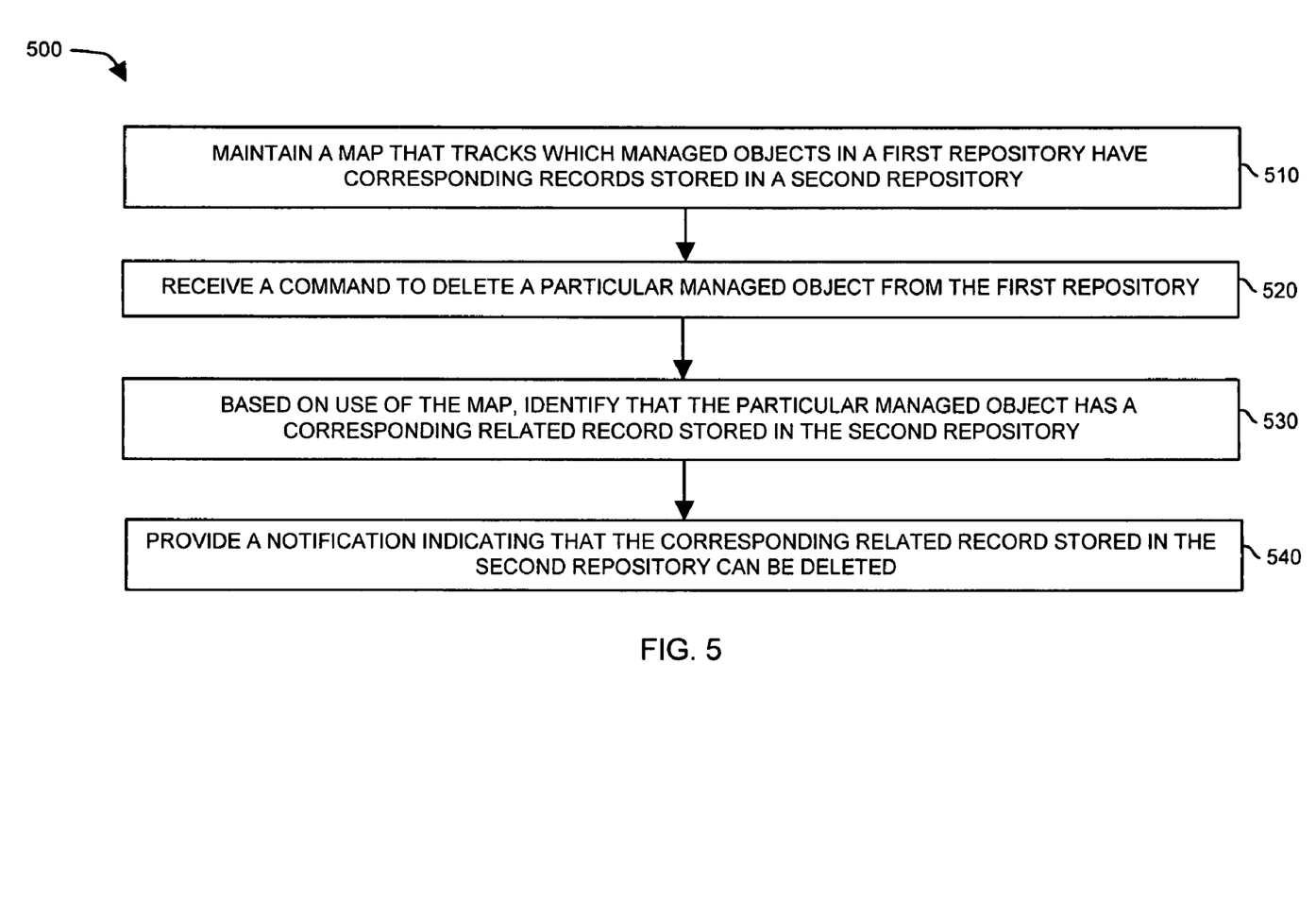
FIG. 5 is a flowchart illustrating maintenance of a map to provide notification according to an embodiment herein.

Now, more particularly, FIG. 5 is a flowchart 500 illustrating a technique of maintaining information associated with a respective storage area network environment according to an embodiment herein. Note that techniques discussed in flowchart 500 overlap with the techniques discussed above.

In step 510, the map manager 140 of management control center 115 maintains a map 160 that tracks which managed objects in object cache 121 or repository 180 have corresponding related records stored in repository 480.

In step 520, the map manager 140 of management control center 115 receives a command to delete a particular managed object from object cache 121 and repository 180.

In step 530, based on use of map 160, the management control center 115 identifies that the particular managed object to be deleted has a corresponding related record stored in the repository 480.

In step 540, the management control center 115 provides a notification indicating that the corresponding related record stored in the repository 480 can be deleted.

Figure 6:
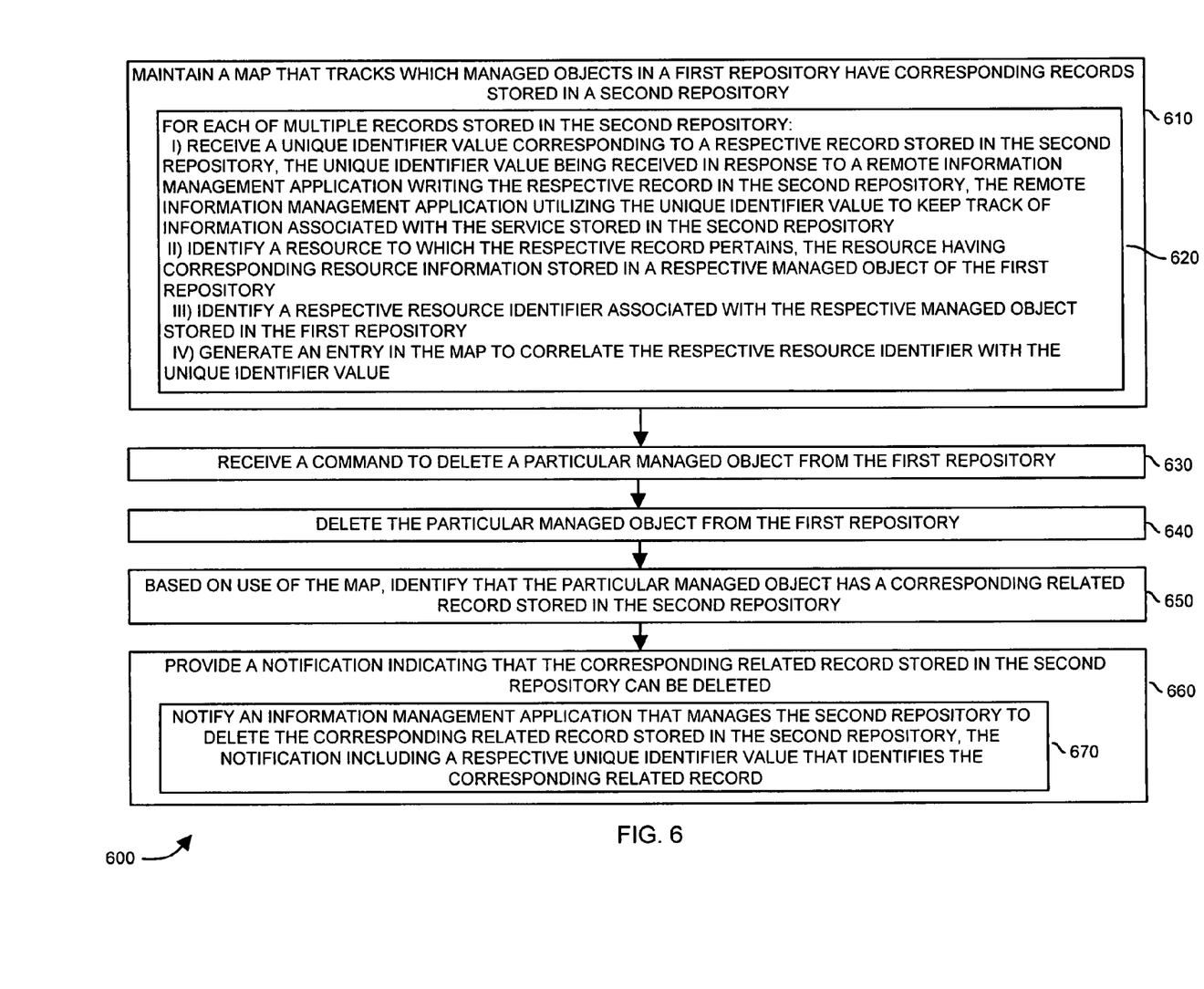
FIG. 6 is a more detailed flowchart illustrating techniques of maintaining a map and providing notification according to embodiments herein.

FIG. 6 is a more detailed flowchart 600 illustrating techniques of maintaining information associated with a respective storage area network environment according to an embodiment herein. Note that techniques discussed in flowchart 600 overlap with the techniques discussed above in the previous figures.

In step 610, the map manager 140 of management control center 115 maintains a map 160 that tracks which of multiple managed objects in repository 180 have corresponding records stored in repository 480.

In sub-step 620 associated with step 610, for each of multiple records stored in repository 480, the map manager 140:

i) receives a unique identifier value corresponding to a respective record stored in repository 480, the unique identifier value being received in response to a remote information management application (e.g., record manager 440) writing the respective record to repository 480, the remote information management application utilizing the unique identifier value to keep track of information associated with respective service data stored in repository 480;

ii) identifies a resource (e.g., managed object) to which the respective record (stored in repository 480) pertains, the resource having corresponding resource information stored in a respective managed object of repository 180;

iii) identifies a respective resource identifier (e.g., managed object identifier) associated with the respective managed object stored in repository 180; and iv) generates an entry in the map 160 to correlate the respective resource identifier of the managed object with the unique identifier value of the related record stored in repository 480.

In step 630, the management control center 115 receives a command to delete a particular managed object from repository 180.

In step 640, the management control center 115 initiates deletion of the particular managed object from repository 180. This can be done before or after other steps in this flowchart. For example, deletion of managed objects can occur before or after the step of notification.

In step 650, the management control center 115 (e.g., via map manager 140) identifies that the particular managed object has a corresponding related record stored in repository 480.

In step 660, the management control center 115 provides notification indicating that the corresponding related record stored in repository 480 can be deleted by notifying, in substep 670, an information management application (e.g., record manager 440) that manages repository 480 to delete the corresponding related record stored in repository 480. The notification includes a respective unique identifier value that identifies the corresponding related record. In one embodiment, the notification includes a list of multiple unique identifier values of corresponding records that can be deleted from repository 480 in response to receiving the delete command and deleting multiple managed objects from the respective repository 180.

Figure 7:
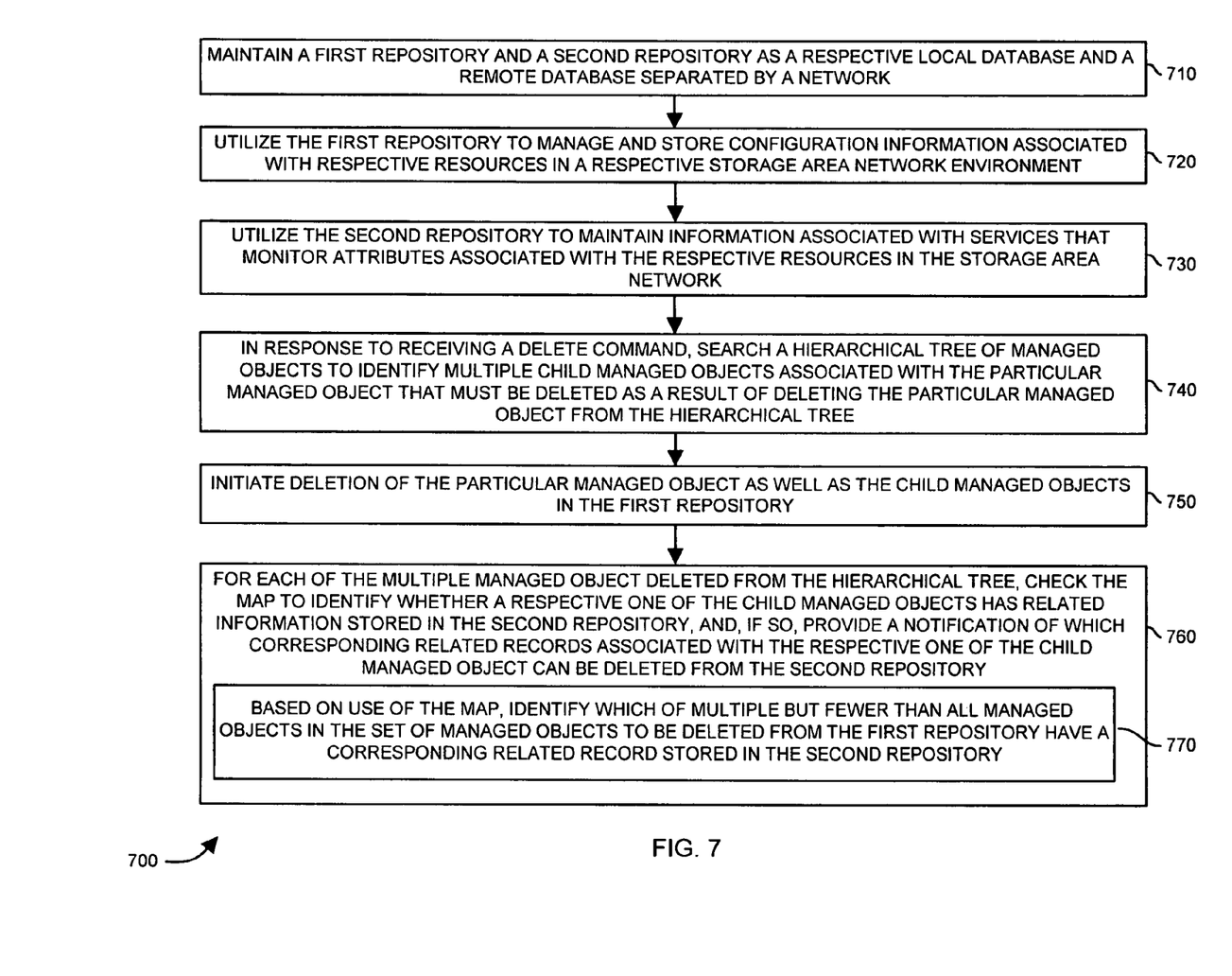
FIG. 7 is a more detailed flowchart illustrating techniques of maintaining a map and providing notification according to embodiments herein.

FIG. 7 is a more detailed flowchart 700 illustrating techniques of maintaining information associated with a respective storage area network environment according to an embodiment herein. Note that techniques discussed in flowchart 700 overlap with the techniques discussed above in the previous figures.

In step 710, respective control centers (e.g., management control center 115 and remote control center 415) maintain respective repository 180 and repository 480 as a respective local database and a remote database separated by network 350.

In step 720, the management control center 115 utilizes repository 180 to manage and store configuration information associated with respective resources (e.g., managed objects) in a respective storage area network environment 100.

In step 730, the remote control center 415 utilizes repository 480 to maintain information associated with services that monitor attributes associated with the respective resources in the storage area network environment 100.

In step 740, in response to receiving a delete command, the management control center 115 employs map manager 140 to search a hierarchical tree of managed objects (e.g., object hierarchy 107) to identify multiple child managed objects associated with the particular managed object that must be deleted as a result of deleting the particular managed object from the hierarchical tree.

In step 750, the management control center 115 initiates deletion of the particular managed object (as identified by the command) as well as the child managed objects in repository 180 associated with the particular managed object.

In step 760, for each of the multiple managed object deleted from the object hierarchy 107 (e.g., hierarchical tree), the management control center 115 utilizes map manager 140 to check the map 160 to identify whether a respective one of the child managed objects has related information stored in repository 480. If so, the management control center 115 provides a notification of which corresponding related records associated with the respective one of the child managed object can be deleted from repository 480.

In step 770, based on use of the map 160, the map manager 140 of management control center 115 identifies which of multiple but fewer than all managed objects in the set of managed objects to be deleted from the object cache 121 and/or repository 180 have a corresponding related record stored in repository 480 and provide. Thereafter, the management control center 115 provides a corresponding notification to the remote control center 415 of the records that can be deleted from repository 480.

Figure 8:
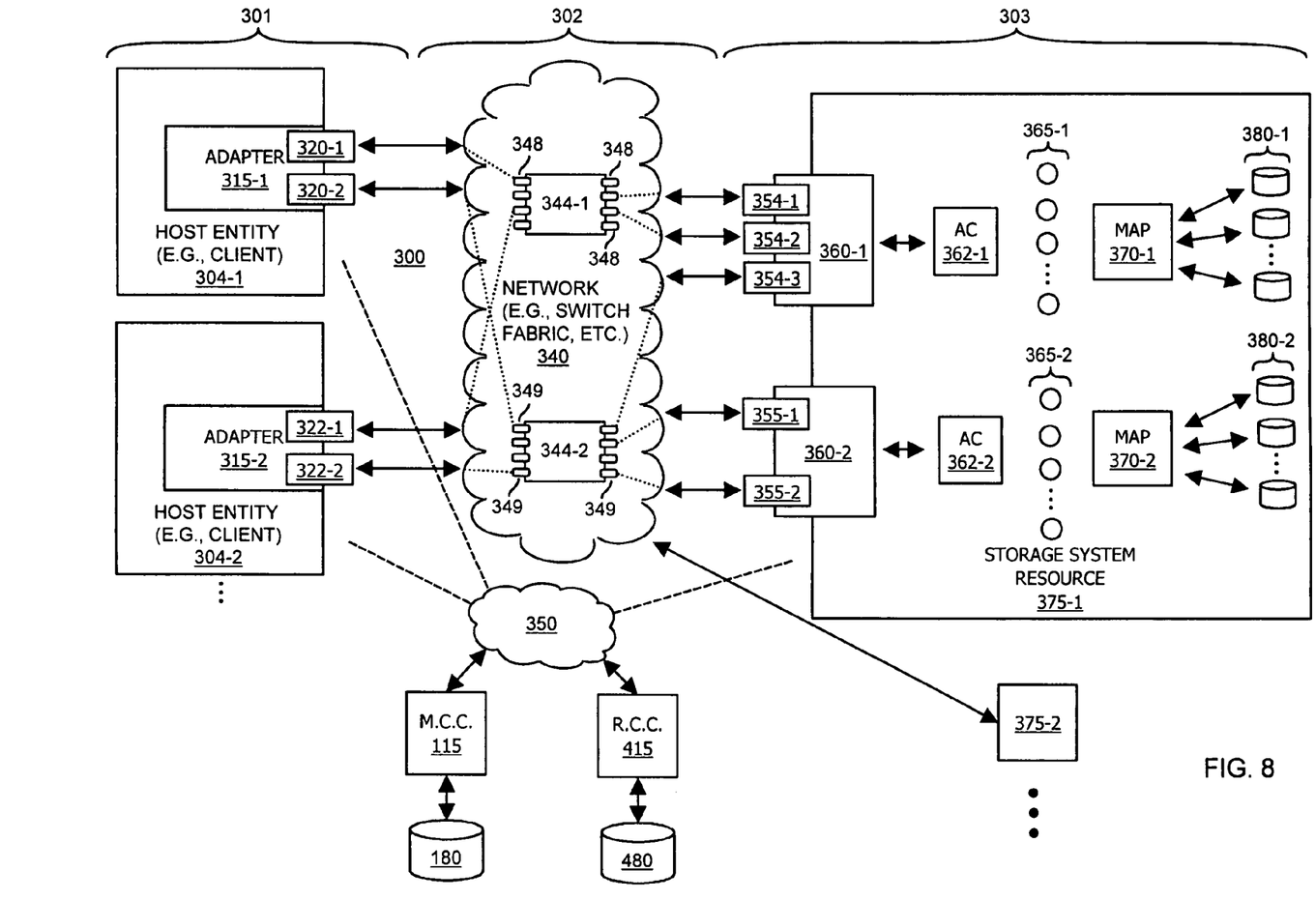
FIG. 8 is a block diagram illustrating resources in a storage area network environment represented by managed objects according to an embodiment herein.

FIG. 8 is a block diagram more particularly illustrating connectivity of example network resources (e.g., host resources 301, switch resources 302, and storage resources 303) in a storage area network environment 300. The network resources can be represented by managed objects and corresponding relationship information stored in repository 180.

As shown, storage area network environment 300 includes host entity 304-1, host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and repository. Network 340 includes switch device 344-1, switch device 344-2, and corresponding switch ports 348 and 349. Host entity 304-1 includes adapter 315-1. Adapter 315-1 (e.g., host bus adapter) has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, network 340 and related resources enable host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 (e.g., a storage system) includes access controllers 362 to facilitate access to corresponding storage devices 365 (e.g., logical storage space or devices). Storage devices 365 are configured as logical portions of one or more physical storage devices 380 (e.g., arrays of one or more storage disks or portions thereof). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340.

Management control center 115 enables a storage area network administrator at a remote process to communicate over network 350 and modify a configuration of the storage area network 300. For example, in one embodiment, a storage area network administrator at a respective process (110 or 410) can modify the configuration of storage area network 300 by sending a respective command to management control center 115 to initiate a particular command (e.g., delete) with respect to a managed object representing a respective storage system in the storage area network.

In response to receiving the command, management control center initiates deletion of managed objects from repository 180 and object cache 121. The management control center 115 then utilizes map manager 140 and map 160 to identify which portion of the deleted managed objects have corresponding related information that must be deleted from repository 480. The management control center 115 then notifies record manager 440 of remote control center 415 of such records that need to be deleted.

As discussed above, techniques herein are well suited for use in environments supporting notification of changes to objects or object hierarchies having respective object data stored in a relational database. One such application for applying these techniques is a storage area network environment. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

We claim:

1. A method for maintaining information associated with a respective storage area network environment, the method comprising:
    maintaining a map that tracks which managed objects in a first repository have corresponding records stored in a second repository;
    receiving a command to delete a particular managed object from the first repository;
    based on use of the map, identifying that the particular managed object has a corresponding related record stored in the second repository; and
    providing a notification indicating that the corresponding related record stored in the second repository can be deleted;
    wherein the particular managed object stored in the first repository stores configuration information associated with a given resource in a storage area network;
    wherein the corresponding related record stored in the second repository stores information collected from a service that monitors the given resource;
    wherein maintaining the map includes maintaining a hash map that enables conversion of a resource identifier value specifying the particular managed object as stored in the first repository into a unique identifier value associated with the corresponding related record stored in the second repository;
    utilizing the hash map to convert the resource identifier value associated with the particular managed object into a unique identifier value associated with the corresponding related record stored in the second repository; and
    wherein providing the notification includes notifying an information management application that manages the second repository to delete the corresponding related record stored in the second repository by including the unique identifier value in the notification;
    in response to receiving the command to delete the particular managed object, identifying a set of managed objects in a respective storage area network resource hierarchy that: i) are related to the particular managed object being deleted from the first repository, and ii) will also be deleted from the first repository;
    based on use of the map, identifying which of multiple but fewer than all managed objects in the set of managed objects to be deleted from the first repository have a corresponding related record stored in the second repository; and
    for each of the managed objects in the set having a corresponding related record in the second repository, providing a respective unique identifier value associated with the corresponding related record to notify a remote information management application of which records to delete from the second repository;
    wherein providing the notification occurs after initiating deletion of: i) the particular managed object, and ii) the multiple but fewer than all managed objects in the set.

2. The method as in claim 1, wherein maintaining the map includes:
    for each of multiple records stored in the second repository:
        receiving a unique identifier value corresponding to a respective record stored in the second repository;
        identifying a resource in the storage area network to which the respective record pertains, the resource having corresponding resource configuration information stored in a respective managed object of the first repository;
        identifying a respective resource identifier associated with the respective managed object stored in the first repository; and
        generating an entry in the map to correlate the respective resource identifier with the unique identifier value, the entry enabling mapping of the respective managed object to the respective record.

3. The method as in claim 1, wherein maintaining the map includes:
    receiving a unique identifier value in response to a remote management application initiating a service with respect to a storage area network resource corresponding to the particular managed object stored in the first repository, the remote management application utilizing the unique identifier value to keep track of information associated with the service stored in the second repository, the service configured to retrieve information about a storage area network resource as represented by the particular managed object stored in the first repository.

4. The method as in claim 3, wherein maintaining the map further includes:
    storing the unique identifier value in an entry of the map along with a corresponding resource identifier value associated with the particular managed object stored in the first repository, the entry specifying a relationship between the particular managed object and the corresponding related record stored in the second repository.

5. The method as in claim 1, wherein maintaining the map includes:
    receiving a unique identifier value in response to a remote management application initiating a service with respect to a storage area network resource associated with the particular managed object stored in the first repository, the remote management application utilizing the unique identifier value to keep track of information associated with the service stored in the first repository, the service keeping track of and providing alerts with respect to the storage area network resource; and
    storing the unique identifier value in an entry of the map along with a corresponding resource identifier value associated with the particular managed object stored in the first repository, the entry specifying a relationship between the particular managed object and the corresponding related record that stores the alerts with respect to the storage area network environment resource.

6. The method as in claim 1 further comprising:
maintaining the first repository and the second repository as a respective local database and a remote database separated by a network;
utilizing the first repository to manage and store configuration information associated with respective resources in a storage area network; and
utilizing the second repository to maintain information associated with services that monitor attributes associated with the respective resources in the storage area network.

7. The method as in claim 1, further comprising:
in response to receiving the command, searching a hierarchical tree of managed objects to identify multiple child managed objects associated with the particular managed object that will be deleted as a result of deleting the particular managed object from the hierarchical tree;
initiating deletion of the particular managed object as well as the child managed objects; and
for each of the multiple managed object deleted from the hierarchical tree, check the map to identify whether a respective one of the child managed objects has related information stored in the second repository, and, if so, providing a notification of which corresponding related records associated with the respective one of the child managed object can be deleted from the second repository.

8. The method as in claim 1 further comprising:
maintaining the first repository to store configuration information associated with the managed objects, the managed objects including configuration information of resources present in the storage area network, the particular managed object stored in the first repository including configuration information associated with a particular resource in the storage area network;
maintaining the second repository to store the records, the records storing information derived from services that monitor the resources in the storage area network, the corresponding related record storing information collected from a service that monitors the particular resource in the storage area network.

9. A computer system that facilitates notification of changes associated with a managed object having corresponding data stored in a relational database, the computer system comprising:
a processor;
a memory that stores instructions associated with an application executed by the processor; and
an interconnect coupling the processor and the memory, enabling the computer system to execute the application and perform operations of:
maintaining a map that tracks which managed objects in a first repository have corresponding records stored in a second repository;
receiving a command to delete a particular managed object from the first repository;
based on use of the map, identifying that the particular managed object has a corresponding related record stored in the second repository; and
providing a notification indicating that the corresponding related record stored in the second repository can be deleted;
wherein the particular managed object stored in the first repository stores configuration information associated with a given resource in a storage area network;
wherein the corresponding related record stored in the second repository stores information collected from a service that monitors the given resource;
wherein maintaining the map includes maintaining a hash map that enables conversion of a resource identifier value specifying the particular managed object as stored in the first repository into a unique identifier value associated with the corresponding related record stored in the second repository;
utilizing the hash map to convert the resource identifier value associated with the particular managed object into a unique identifier value associated with the corresponding related record stored in the second repository; and
wherein providing the notification includes notifying an information management application that manages the second repository to delete the corresponding related record stored in the second repository by including the unique identifier value in the notification;
in response to receiving the command to delete the particular managed object, identifying a set of managed objects in a respective storage area network resource hierarchy that: i) are related to the particular managed object being deleted from the first repository, and ii) will also be deleted from the first repository;
based on use of the map, identifying which of multiple but fewer than all managed objects in the set of managed objects to be deleted from the first repository have a corresponding related record stored in the second repository;
for each of the managed objects in the set having a corresponding related record in the second repository, providing a respective unique identifier value associated with the corresponding related record to notify a remote information management application of which records to delete from the second repository; and
wherein providing the notification occurs after initiating deletion of: i) the particular managed object, and ii) the multiple but fewer than all managed objects in the set.

10. The computer system as in claim 9, wherein maintaining the map includes:
receiving a unique identifier value in response to a remote management application initiating an alert service with respect to a storage area network resource associated with the particular managed object stored in the first repository, the remote management application utilizing the unique identifier value to keep track of information associated with the alert service stored in the first repository, the alert service keeping track of and providing alerts when the storage area network resource exceeds a capacity threshold value; and
storing the unique identifier value in an entry of the map along with a corresponding resource identifier value associated with the particular managed object stored in the first repository.

11. The computer system as in claim 9 further supporting operations of:
in response to receiving the command, searching a hierarchical tree of managed objects to identify multiple child managed objects associated with the particular managed object that will be deleted as a result of deleting the particular managed object from the hierarchical tree;
initiating deletion of the particular managed object as well as the child managed objects; and
for each of the multiple managed object deleted from the hierarchical tree, check the map to identify whether a respective one of the child managed objects has related information stored in the second repository, and, if so, providing a notification of which corresponding related records associated with the respective one of the child managed object can be deleted from the second repository.

12. A computer program product including a computer-readable storage medium having instructions stored thereon for processing data information, such that the instructions, when carried out by a processing device, enable the processing device to perform the steps of:

maintaining a map that tracks which managed objects in a first repository have corresponding records stored in a second repository;

receiving a command to delete a particular managed object from the first repository;

based on use of the map, identifying that the particular managed object has a corresponding related record stored in the second repository; and     providing a notification indicating that the corresponding related record stored in the second repository can be deleted;

wherein the particular managed object stored in the first repository stores configuration information associated with a given resource in a storage area network;

wherein the corresponding related record stored in the second repository stores information collected from a service that monitors the given resource;

wherein maintaining the map includes maintaining a hash map that enables conversion of a resource identifier value specifying the particular managed object as stored in the first repository into a unique identifier value associated with the corresponding related record stored in the second repository;

utilizing the hash map to convert the resource identifier value associated with the particular managed object into a unique identifier value associated with the corresponding related record stored in the second repository;

wherein providing the notification includes notifying an information management application that manages the second repository to delete the corresponding related record stored in the second repository by including the unique identifier value in the notification;

in response to receiving the command to delete the particular managed object, identifying a set of managed objects in a respective storage area network resource hierarchy that: i) are related to the particular managed object being deleted from the first repository, and ii) will also be deleted from the first repository;

based on use of the map, identifying which of multiple but fewer than all managed objects in the set of managed objects to be deleted from the first repository have a corresponding related record stored in the second repository;

for each of the managed objects in the set having a corresponding related record in the second repository, providing a respective unique identifier value associated with the corresponding related record to notify a remote information management application of which records to delete from the second repository; and     wherein providing the notification occurs after initiating deletion of: i) the particular managed object, and ii) the multiple but fewer than all managed objects in the set.

\* \* \* \* \*